United States Patent [19]

Scott et al.

[11] Patent Number: 4,726,432

[45] Date of Patent: Feb. 23, 1988

[54] DIFFERENTIALLY HARDFACED ROCK BIT

[75] Inventors: Danny E. Scott; Eric C. Sullivan, both of Houston, Tex.

[73] Assignee: Hughes Tool Company-USA, Houston, Tex.

[21] Appl. No.: 72,315

[22] Filed: Jul. 13, 1987

[51] Int. Cl.⁴ ............................................ E21B 10/50
[52] U.S. Cl. .................................. 175/375; 29/527.4; 76/108 A
[58] Field of Search .................... 175/374, 375, 411; 76/108 R, 108 A; 29/527.1, 527.2, 527.4, 527.6, DIG. 49

[56] References Cited

U.S. PATENT DOCUMENTS

| | | | |
|---|---|---|---|
| 2,043,142 | 6/1936 | Zublin | 76/108 |
| 2,306,683 | 12/1942 | Zublin | 175/375 |
| 2,371,488 | 3/1945 | Williams | 175/330 |
| 2,660,405 | 11/1953 | Scott et al. | 175/375 |
| 3,127,945 | 5/1964 | Bridwell et al. | 175/329 |
| 3,260,579 | 7/1966 | Scales et al. | 29/195 |
| 3,778,580 | 12/1973 | Bierwith | 219/73 |
| 3,800,891 | 5/1974 | White et al. | 175/374 |
| 3,946,817 | 3/1976 | Prince | 175/374 |
| 4,262,761 | 5/1981 | Crow | 175/374 |
| 4,274,769 | 6/1981 | Multakh | 408/145 |
| 4,533,004 | 8/1985 | Ecer | 175/329 |

*Primary Examiner*—Stephen J. Novosad
*Attorney, Agent, or Firm*—Charles D. Gunter, Jr.

[57] ABSTRACT

A method for manufacturing an earth boring drill bit and bit produced thereby are shown. The bit has rotatable cutters with a plurality of milled teeth, each of the teeth having opposing flanks. A first tube hardfacing is applied to a selected one of the opposing flanks, the hardfacing comprising a metallic binder with wear-resistant particles dispersed throughout the binder. The other of the opposing flanks has a second tube hardfacing applied thereto. The particle size of the wear-resistant particles differs between the first and second tube hardfacings so that the resulting difference in abrasion resistance of the tooth flanks produces a self-sharpening effect as the tooth wears.

8 Claims, 4 Drawing Figures

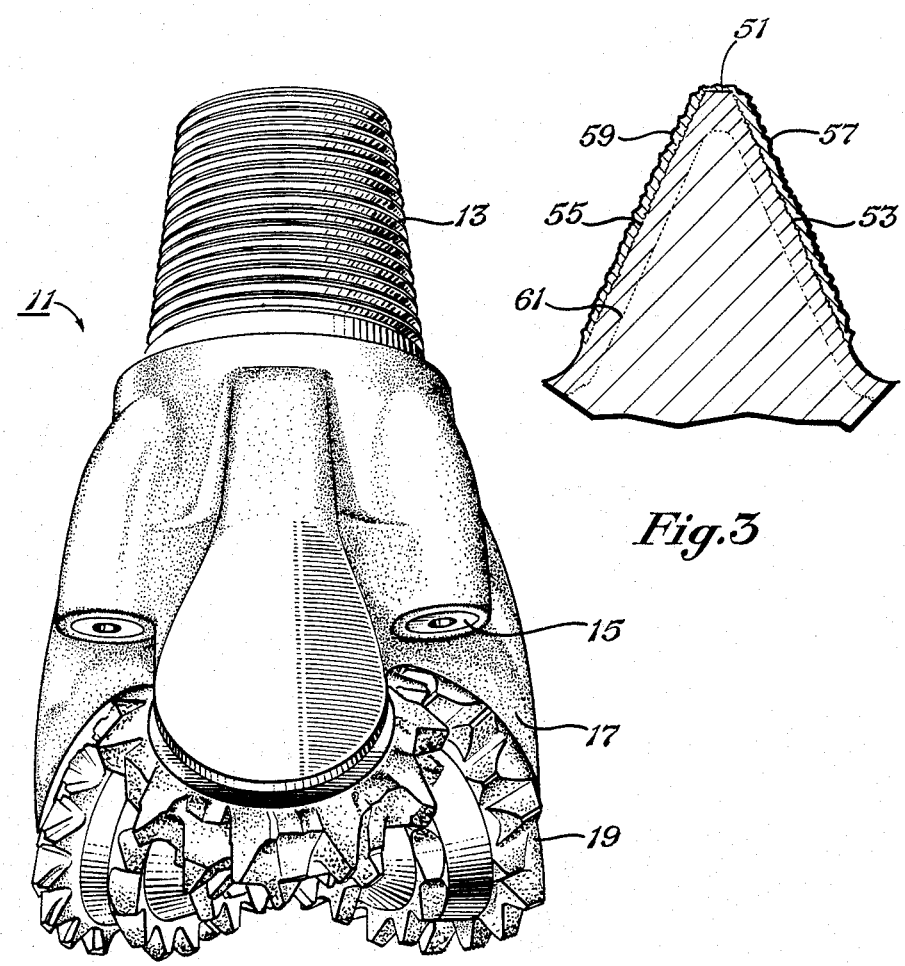
Fig.3
Fig.1
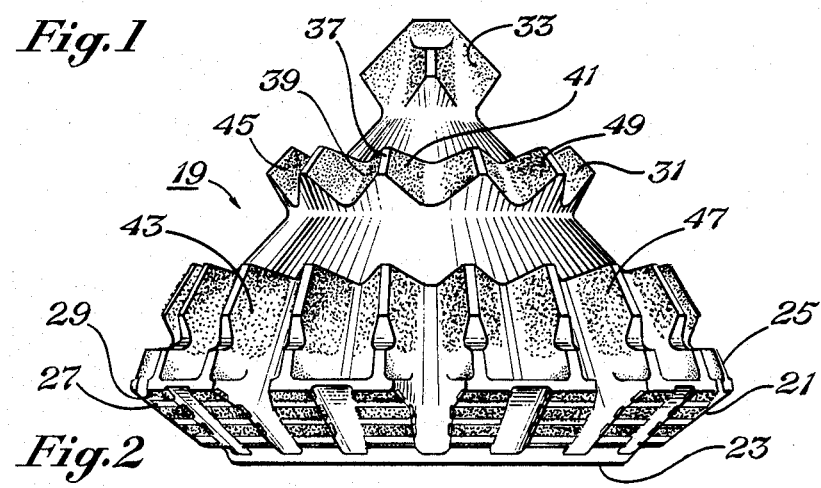
Fig.2

DIFFERENTIALLY HARDFACED ROCK BIT

BACKGROUND OF THE INVENTION

1. Field of the Invention

This invention relates in general to earth boring drill bits, particularly to metallurgical treatments that increase the wear resistance, and hence the life of cutters and teeth exposed to abrasive wear.

2. Description of the Prior Art

The common prior art method for retarding the abrasive wear of teeth and cutters used in earth boring drill bits is the application of hardfacing to selected surfaces. A typical hardfacing used on teeth and cutters is a composite material consisting essentially of an alloy steel matrix in which is dispersed particles of sintered tungsten carbide. Prior art hardfacing application techniques include "sweat on" and "tube-application". To produce the sweat-on structure, an aqueous solution of sodium silicate is applied to the steel surface to be coated, tungsten carbide particles are brushed on or otherwise applied to the wet surface, and the water is allowed to evaporate. Heat is then applied to the surface via a welding torch until the steel is sufficiently fused to permit the particles to sink to a depth equal to approximately 75% of the granule diameter, after which the torch is moved on and the surface is allowed to cool.

In the tube type hardfacing, a combination of binder metal and tungsten carbide granules are applied simultaneously to a locally preheated surface. A welding torch is used to both heat the work area and to melt the tube of hardfacing. The tube consists of a hollow steel cylinder filled with a crushed or agglomerated tungsten carbide and sometimes with other materials, the ends of the tube being crimped or otherwise sealed to prevent the carbide filler from shaking out during storage and handling. The wall thickness and inside diameter of the tube are so related that the proportions of the two materials are known. A preferred composition contains about sixty weight-percent tungsten carbide to forty weight-percent binder.

The tube material can be a low carbon steel. Although such steels are relatively soft prior to use as a binder, they become abrasion resistant as the result of the alloying that occurs during application. Various other steels including alloy steels can be used as the binders in tube applications. When alloy steels are used, the alloying elements may either be incorporated in the carbon steel of the wall, or preferably, may be included as powders with particulate filler of tungsten carbide or the like. One such material thus added is a combination of ferromanganese and ferromolybdenum, the quantities being such that the over-all composition of the binder is about 1.0% manganese, 0.25% molybdenum, the balance being essentially low carbon steel.

Tube hardfacing can be made considerably thicker than sweat-on hardfacings without loss of integrity. As a result, tube hardfaced surfaces can be provided with an abrasion resistance which exceeds that of surfaces having sweat-on hardfacings.

In addition to providing increased abrasion resistance, hardfacings are typically applied to the teeth of rock bit cones to achieve a "self-sharpening" effect. Thus, in certain of the prior art bits, the hardfacing was applied on only one flank of the tooth. As the steel on the non-hardface flank wears or chips away, a sharp crest is maintained. In other of the prior art bits, a tube metal heavy deposit of tungsten carbide granules in an alloy steel matrix was applied on one part of the cone tooth. A sweat-on light application of hardfacing was applied to the tip of the other surface of the tooth. This structure also provided a "self sharpening" effect and maintained penetration rate. A third method of hardfacing to improve overall tooth wear resistance is known as "full flank" hardfacing. In this method, both flanks (and sometimes the inner and outer ends) of the tooth are hardfaced with the same tube material, the overall tooth wear resistance and life is improved, but the tooth loses the "self sharpening" effect generated by both of the above mentioned prior art methods and the wear tends to blunt the tooth rather than sharpening it, thus slowing the penetration of the bit. Despite the previously mentioned improvements, a need exists to improve the wear resistance of the tooth even further, without detracting from the self-sharpening effect.

SUMMARY OF THE INVENTION

In the present invention, the cutter teeth on an earth boring drill bit are differentially hardfaced with tube hardfacing compositions to provide improved wear resistance while maintaining the self-sharpening effect as the tooth wears. The cutter teeth are formed on a steel cone, each tooth having a crest defined between opposing flanks. A first, coarse tube hardfacing is bonded to a selected one of the opposing flanks. The other of the opposing tooth flanks has a second, finer tube hardfacing applied thereto. The coarse and fine tube hardfacings each comprise a metallic binder with wear resistant particles dispersed throughout the binder. Preferably each tube hardfacing comprises an alloy steel matrix having wear resistant, tungsten carbide particles dispersed therein. The first, coarse tube hardfacing is selected to have a wear resistance which differs from that of the second, finer tube hardfacing by a predetermined amount so that the resulting difference in abrasion resistance of the tooth flanks produces a self-sharpening effect as the tooth wears. The difference in wear resistance between the first and second hardfacings results from a difference in the particle size of the tungsten carbide particles present in the hardfacings.

Additional objects, features and advantages will be apparent in the description which follows.

DESCRIPTION OF THE DRAWINGS

FIG. 1 is a perspective view of an earth boring drill bit having the cutters and teeth that receive the metallurgical treatment described herein.

FIG. 2 is a side view of one of the cutters used in the earth boring drill bit of FIG. 1, showing the opposing teeth flanks and hardfacing of the invention.

FIG. 3 is a side cross-sectional view, of a tooth of the cutter of FIG. 2 showing the differential hardfacing of the invention.

DETAILED DESCRIPTION OF THE INVENTION

Figure 4:
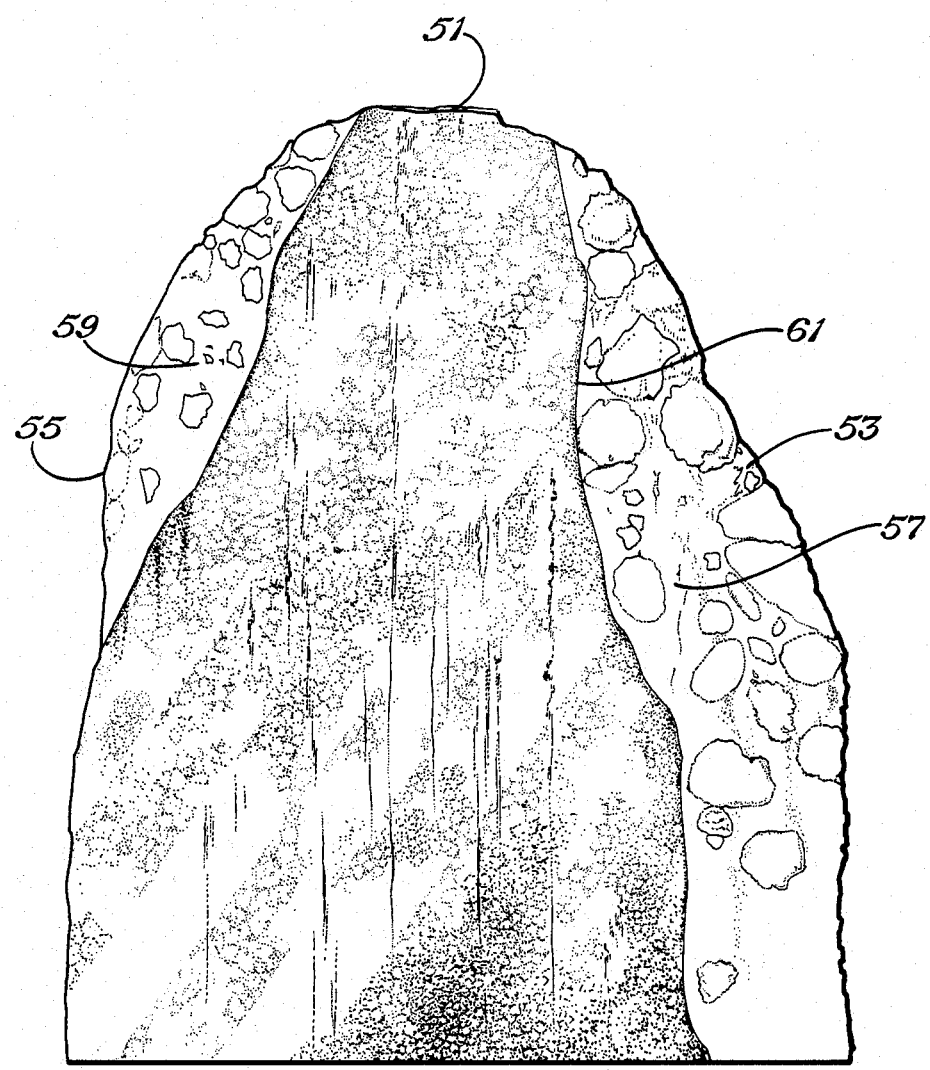
FIG. 4 is a view of the tooth of FIG. 3 at approximately 20X magnification showing the differential hardfacing of the invention.

The numeral 11 in the drawing designates a typical earth boring drill bit having a threaded shank 13 for attachment to a drill string member. Nozzles 15 are provided as a means for directing a flow of fluid toward the borehole bottom. The bit shown in FIG. 1 is also provided with three depending legs or head sections 17 that each support a toothed, rotatable cutter 19, sometimes referred to as a "cone."

FIG. 2 shows a cutter 19 from the side, including a conical gage surface 21 extending from the backface 23, to the heel row teeth 25. The gage surface is formed with alternate areas of steel ribs 27 and bands 29 of composite hardfacing material consisting essentially of an alloy steel matrix and particles of sintered or cemented tungsten carbide. This particular cutter has an intermediate row 31 of teeth and a extreme inner row or spear point 33. The cutter is mounted on leg 17 by means of a cantilevered shaft that forms a bearing means on the interior of the cutter.

As shown in FIG. 2, each of the teeth has a tooth crest 37 defined between opposing flanks 39,41. In operation, the bit is rotated so that the cone or cutter 19 revolves clockwise about an imaginary axis passing vertically through the apex of the spear point 33, as viewed in FIG. 2. Thus, each of the teeth contact the formation being drilled so that on the heel row 25 and intermediate row 31 the respective flanks 43, 45 are trailing while flanks 47, 49 are leading.

In the cone illustrated in FIG. 2, each tooth of the heel row 25 is hardfaced on the leading flank 47 with a first, coarse tube hardfacing while each trailing flank 43 is hardfaced with a second, finer tube hardfacing. The intermediate row is similarly hardfaced. The choice of flank to be hardfaced is a matter of experience and varies from one formation to another and also varies with the expected drilling conditions such as weight, rotary speed, type and rate of circulation of drilling fluids, etc. In some formations and under some conditions, the hardfacing to be used may be the reverse of that illustrated, or other surfaces of the tooth may be hardfaced as well.

FIG. 3 is a side, cross-sectional view of a typical tooth of the cutter 19 having tube hardfacings of the invention. The tooth has a crest 51, a leading flank 53 and a trailing, or opposite flank 55. A first tube hardfacing 57 is applied to the leading flank 53. A second tube hardfacing 59 is applied to the trailing flank 55. Also discernible in FIG. 3 is the carburized case 61 of the tooth.

Each of the tube hardfacings includes a metallic binder, preferably an alloy steel matrix having wear resistant particles dispersed therein. The wear resistant particles are preferably sintered or cast tungsten carbide particles. Such tube hardfacings are known to those skilled in the art and are described, for instance, in U.S. Pat. No. 3,800,891, issued Apr. 2, 1974, and assigned to the assignee of the present invention. Suitable hardfacing materials are also commercially available from the Hughes Tool Company in Houston, Texas as the "HUGHES-X" hardfacing materials. The S20 tube hardfacing has tungsten carbide particles with a particle size in the range from about 0.023" to 0.065" or mean particle size of about 0.050". The S30 hardfacing has a tungsten carbide particle size in the range from about 0.020" to 0.032", or a mean particle size of about 0.030". The S45 hardfacing has a particle size in the range from about 0.07" to 0.028", or a mean particle size of about 0.020".

In manufacturing a bit of the invention, the first and second tube hardfacings contain different size wear resistant particles so that the resulting difference in abrasion resistance produces a self-sharpening effect as the tooth wears. Preferably, the mean particle size difference between the first tube hardfacing 57 and the second tube hardfacing 59 is at least about thirty percent. On smaller sized rotary rock bits, the S30 tube hardfacing has been applied to the leading flank 53 with the S45 tube hardfacing being applied to the trailing flank 55. On larger diameter bits, the S20 tube hardfacing has been applied to one flank of the tooth with the S30 tube hardfacing being applied to the opposing flank. FIG. 4 is a view of the tooth of FIG. 3, but at approximately 20× magnification, showing the differential hardfacing of the invention. The larger particle size wear resistant particles will be apparent in the hardfacing 57 on the leading flank 53. The following example is illustrative of the invention:

EXAMPLE 1

A steel toothed cone is forged from a modified AISI 4815 steel containing about 3½% nickel and 0.35% molybdenum and containing approximately 0.15% carbon. The teeth are machined in the desired shape and location. Next, the leading flanks of each tooth in the cutter are hardfaced with a first, coarse tube hardfacing. The trailing flanks of each tooth are hardfaced with a second, finer tube hardfacing, each surface of the tooth being covered with the hardfacing to a thickness of about 3/64". Each hardfacing contains tungsten carbide particles, the mean particle size in the first tube hardfacing being about 0.050" and the mean particle size in the second tube hardfacing being about 0.030". The tube wall is of low carbon steel and the carbide filling of the tube includes sufficient ferromolybdenum and ferromanganese powders to make a binder of pre-application composition of about 1% manganes, 0.25% molybdenum and the balance essentially low carbon steel. The raw material ratio is about 60 weight-percent tungsten carbide and 30 weight-percent binder and an atomic hydrogen torch is used throughout. The melting point of the binder is around 2700° Fehrenheit.

After hardfacing, the cutter is carburized in a gas atmosphere to create a case depth of about 0.070 inches. Gas carburizing is a well known art and it is the preferred carburizing method. It is described on Pages 93–114 of Volume 2 of 8th Edition of the Metals Handbook, "Heat Treating, Cleaning and Finishing" (1964, American Society for Metals). The cutter is then hardened and tempered. The hardening and tempering of carburized steel is a well known art. The hardening is usually accomplished by quenching in oil, from a temperature of at least 1,390° Fahrenheit, to produce a substantially martensitic case AISI 4815 steel. The tempering temperature is usually in the range of about 290° to 510° Fahrenheit preferably about 330° Fahrenheit, for one hour, to toughen the carburized case without appreciably lowering its strength (hardness) to produce tempered martensite.

Three rotatable cutters treated in accordance with the foregoing example were assembled with head sections to form an earth boring drill bit, which was secured during operation to the lower end of a drill string member by threads. The drill string was then lowered into a borehole and rotated to force the cutter teeth into the earth's formation. The bits of the invention exhibited improved wear resistance while maintaining a good penetration rate due to the self-sharpening feature of the cutter teeth.

While the invention has been shown in only one of its forms, it should be apparent to those skilled in the art that it is not so limited but is susceptible to various changes and modifications without departing from the spirit thereof.

I claim:

1. A method of manufacturing an earth boring drill bit of the type having rotatable cutters, the method comprising the steps of:
   forming a cutter having a plurality of teeth, each of the teeth having opposing flanks;
   applying a first tube hardfacing to a selected one of the opposing flanks, the tube hardfacing comprising a metallic binder having wear resistant particles dispersed therein;
   applying a second tube hardfacing to the other of the opposing flanks, the second tube hardfacing comprising a metallic binder having wear resistant particles dispersed therein, the wear resistant particles in the first tube hardfacing being selected to differ in mean particle size from the wear resistant particles in the second hardfacing so that the resulting difference in abrasion resistance of the tooth flanks produces a self-sharpening effect as the tooth wears.

2. A method of manufacturing an earth boring drill bit of the type having rotatable cutters, the method comprising the steps of:
   forging a steel cutter;
   machining a plurality of teeth on each cutter, each of the teeth having opposing flanks;
   applying a coarse tube hardfacing to a selected one of the opposing flanks, the coarse tube hardfacing comprising an alloy steel matrix having wear resistant, tungsten carbide particles dispersed therein;
   applying a finer tube hardfacing to the other of the opposing flanks, the finer tube hardfacing comprising an alloy steel matrix having wear resistant, tungsten carbide particles dispersed therein, the wear resistant particles in the coarse tube hardfacing being selected to differ in mean particle size from the wear resistant particles in the finer tube hardfacing by at least 30% so that the resulting difference in abrasion resistance of the tooth flanks produces a self-sharpening effect as the tooth wears;
   carburizing the cutter; and
   heat treating the cutter.

3. The method of claim 2, wherein each machined tooth on the cutter has a tooth crest defined between a leading flank and trailing flank and wherein the coarse tube hardfacing is applied to a selected one of the leading and trailing flanks of each tooth, the finer hardfacing being applied to the other of the respective leading and trailing flanks of each tooth.

4. In an earth boring drill bit of the type having rotatable cutters with a plurality of milled teeth, each of the teeth having opposing flanks, the improvement comprising:
   a first tube hardfacing bonded to a selected one of the opposing teeth flanks, the tube hardfacing comprising a metallic binder with wear-resistant particles dispersed throughout the binder, the other of the opposing teeth flanks having a second tube hardfacing applied thereto, and wherein the wear resistant particles in the first tube hardfacing differ in mean particle size from the wear resistant particles in the second hardfacing by at least 30%.

5. In an earth boring drill bit of the type having rotatable cutters with a plurality of machined steel teeth, each of the teeth having opposing flanks, the improvement comprising:
   a first tube hardfacing bonded to a selected one of the opposing flanks, the tube hardfacing comprising an alloy steel matrix having wear resistant, tungsten carbide particles dispersed therein, the other of the opposing flanks having a second tube hardfacing applied thereto, the second tube hardfacing comprising an alloy steel matrix having wear resistant, tungsten carbide particles dispersed therein, and wherein the wear resistant particles in the first tube hardfacing differ in mean particle size from the wear resistant particles in the second tube hardfacing by at least 30% so that the resulting difference in abrasion resistance of the tooth flanks produces a self-sharpening effect as the tooth wears.

6. The earth boring drill bit of claim 5, wherein each tooth has a tooth crest defined between a leading and a trailing flank of the tooth, and wherein the first tube hardfacing is applied to a selected one of the leading and trailing flanks of each tooth, the second hardfacing being applied to the other of the respective flanks of each tooth.

7. The earth boring drill bit of claim 5, wherein the wear resistant particles in the first tube hardfacing are in the range from about 0.023 to 0.065 inches in diameter and wherein the wear-resistant particles in the second tube hardfacing are in the range from about 0.020 to 0.032 inches in diameter.

8. The earth boring drill bit of claim 5, wherein the wear-resistant particles in the first tube hardfacing are in the range from about 0.020 to 0.032 inches and wherein the wear-resistant particles in the second tube hardfacing are in the range from about 0.007 to 0.028 inches in diameter.

* * * * *